(12) United States Patent
Dubois et al.

(10) Patent No.: US 6,940,602 B2
(45) Date of Patent: Sep. 6, 2005

(54) METHOD AND DEVICE FOR HIGH-SPEED INTERFERENTIAL MICROSCOPIC IMAGING OF AN OBJECT

(75) Inventors: Arnaud Dubois, Les Ulis (FR); Claude Boccara, Paris (FR)

(73) Assignee: Centre National de la Recherche Scientific (C.N.R.S.), Paris Cedex (FR)

( * ) Notice: Subject to any disclaimer, the term of this patent is extended or adjusted under 35 U.S.C. 154(b) by 283 days.

(21) Appl. No.: 10/432,018

(22) PCT Filed: Nov. 15, 2001

(86) PCT No.: PCT/FR01/03589

§ 371 (c)(1),
(2), (4) Date: May 19, 2003

(87) PCT Pub. No.: WO02/40937

PCT Pub. Date: May 23, 2002

(65) Prior Publication Data

US 2004/0061867 A1 Apr. 1, 2004

(30) Foreign Application Priority Data

Nov. 17, 2000 (FR) .............................................. 00 14904

(51) Int. Cl.⁷ ................................................. G01B 9/02
(52) U.S. Cl. ....................................... 356/497; 356/512
(58) Field of Search ................................. 356/450, 489, 356/495, 511, 512, 479, 497

(56) References Cited

U.S. PATENT DOCUMENTS

| | | | | |
|---|---|---|---|---|
| 4,818,110 A | * | 4/1989 | Davidson | 356/512 |
| 5,194,918 A | | 3/1993 | Kino et al. | |
| 6,775,006 B2 | * | 8/2004 | Groot et al. | 356/497 |

FOREIGN PATENT DOCUMENTS

FR     2 664 048     1/1992

* cited by examiner

Primary Examiner—Gregory J. Toatley, Jr.
Assistant Examiner—Patrick Connolly
(74) Attorney, Agent, or Firm—Young & Thompson

(57) ABSTRACT

A method and a device for interferential microscopic imaging of an object which comprises sending a light beam in each of the arms of a two-wave interferometer, one of the arms comprising the object to be analyzed. The phase is subjected to a sinusoidal modulation to a frequency f. The signal modulation results from mechanical oscillation of an assembly of elements of the interferometer. The interference signal (S) is integrated during the phase variation via a multichannel sensor. A computer enables to record the integrated interference signal obtained during each period fraction 1/n and to calculate, subsequently, the image of the object. The invention is potentially useful for characterizing thin layers, for controlling components in microelectronics, for reading data stored in volume (3D) and objects unstable in time; in biology and in vivo studies.

10 Claims, 4 Drawing Sheets

$E_1$ $E_2$

5a)

$E_3$ $E_4$ $$\tan(\phi) = \frac{E_1 - E_2 - E_3 + E_4}{E_1 - E_2 + E_3 - E_4}$$

5b)

5c)

METHOD AND DEVICE FOR HIGH-SPEED INTERFERENTIAL MICROSCOPIC IMAGING OF AN OBJECT

This invention concerns a method and a device for high rate interferential microscopic imaging of an object.

It is known that the amplitude division interferential systems have great practical importance. They measure a phase difference introduced between two waves. The Michelson interferometer is used, for instance, in the industry, to measure very small distances with great accuracy. Distances in the order of 0.1 μm may thus typically be measured. The phase modulation is a known technique (Creath [in Progress in Optics, E. Wolf, ed. Elsevier Science, New-York; 26 (1988) 349] and Schwider [in Progress in Optics, E. Wolf, ed. Elsevier Science, New-York; 28 (1990) 271]). There are two categories of phase modulation interferometers. They are distinguished according to whether the phase is modulated continuously (interferometry with phase integration) or discretely (interferometry with phase hopping).

In phase integration interferometry, the phase is varied continuously and the interference signal is integrated during this variation. This continuous phase variation is, generally, a linear variation. This is advantageously faster than that with phase hopping. However, it remains limited by possible drifts of the integration times and by mechanical inertia problems.

Besides, another device is known, based on one Michelson type interferometer exhibiting not linear modulation of the phase any longer, but sine wave modulation. It is obtained by causing the reference mirror to oscillate using a piezoelectric ceramic (Sasaki and al. [Appl. Opt.; 25 (1986) 3137] and [Appl. Opt.; 26 (1987) 1089]. The object to be analysed is placed on the other arm of the interferometer. This technique enables thus to obtain phase images of the object. However, this technique is not applicable to the Mirau and the Michelson microscopes where the reference mirror is not accessible. It has not been applied to the Linnik microscope.

A variation has also been suggested with the implementation of a photoelastic birefringence modulator for sine wave modulation of the phase and a stroboscopic lighting to transpose the modulation frequency to a frequency compatible with that of the camera (Beaurepaire and al. [Optics Lett.; 23 (1998) 244], Dubois and al. [Optics Lett.; 24 (1999) 309] and a multichannel analogue detection device (U.S. Pat. No. 2,664,048)). It requires, however, the use of polarized light and the light source must be modulated at high rate (several kHz).

The aim of this invention is therefore to provide a method and a device for interferential microscopic imaging, simple in its design and in its operating mode, implementing a two-wave interferometer and sine wave modulation of the phase.

To this end, the invention concerns an interferential microscopic imaging method of an object wherein:
- a beam coming out of a light source is sent to each of the arms of a two-wave interferometer, one of the arms comprising an object,
- continuous phase variation in the interference signal is introduced (S), consisting of a sine wave modulation of frequency f,
- the interference signal (S) is integrated during this phase variation by means of a multichannel detector, According to the invention,
- the modulation of the interference signal (S) results from the mechanical oscillation of a set of elements of the interferometer and has an amplitude $\psi$ and a synchronisation phase $\theta$,
- the multichannel detector operates at a frequency f' so that f'=n f, n being an integer and greater than or equal to 2,
- the integration of the interference signal (S) takes place during fractions 1/n of a modulation period,
- the integrated interference signal is processed digitally in order to calculate an image.

The invention concerns also an interferential microscopic imaging device of an object comprising:
- a light source which generates a luminous beam,
- a two-wave interferometer wherein a sine wave phase modulation of frequency f is introduced,
- an object to be analysed, placed on one of the arms of the two-wave interferometer,
- an optical system focussing the beam, coming out of the beamsplitter on the object to be analysed,
- a multichannel detector which integrates the interference signal (S), According to the invention,
- a mechanical oscillator moves a set of elements of the interferometer thereby modulating the interference signal (S),
- the multichannel detector operating at a frequency f' so that f'=n f, n being an integer and greater than or equal to 2, and generating the integration of the interference signal (S) during fractions 1/n of a modulation period,
- a computer enables to record the interference signal integrated during each fraction of period 1/n and to calculate, then, the image of the object.

In different particular embodiments having each its particular advantages and compatible with numerous technically possible combinations:
- The mechanical oscillator is a piezoelectric system,
- The source is a quasi monochromatic light source,
- The source is a light source exhibiting short coherence length,
- The interferometer is of Linnik type, the set of oscillating elements is the Linnik interferometer, itself, composed of the reference lens, of the reference mirror whereon the lens is focussed, of the beamsplitter, of the lens object and any dephasing plates,
- The interferometer is of Linnik type, the set of oscillating elements is then limited to the single reference mirror,
- The interferometer is of type Mirau, the set of oscillating elements is then composed of the lens of Mirau itself.
- The interferometer is of Michelson type, the set of oscillating elements is then composed of the lens, of the reference mirror and of the beamsplitter, an assembly called lens of Michelson, The invention will be described more in detail with reference to the appended drawings wherein:

Figure 1:
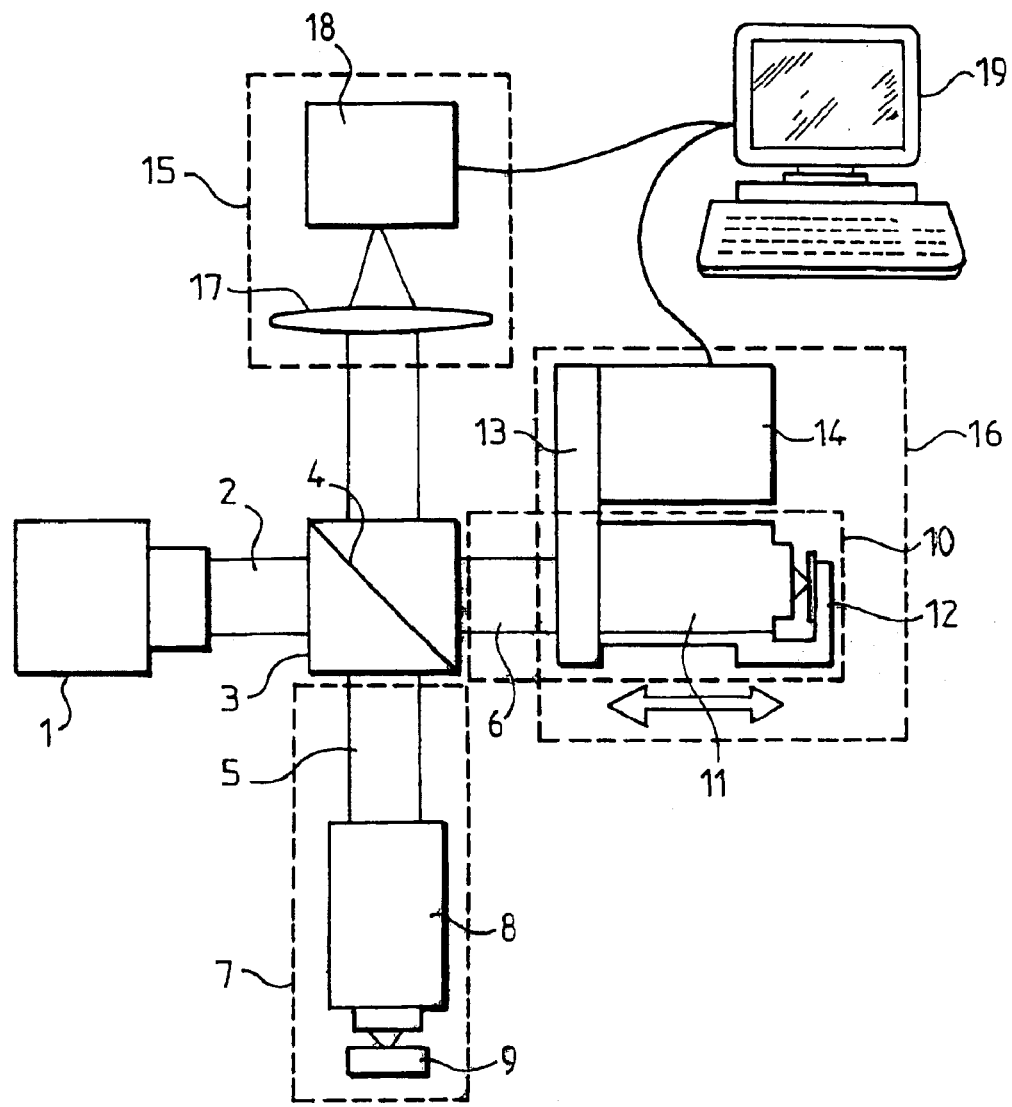
FIG. 1 is a schematic representation of the interferential imaging device, within the framework of an interferometer of Linnik type, according to the invention.
Figure 2:
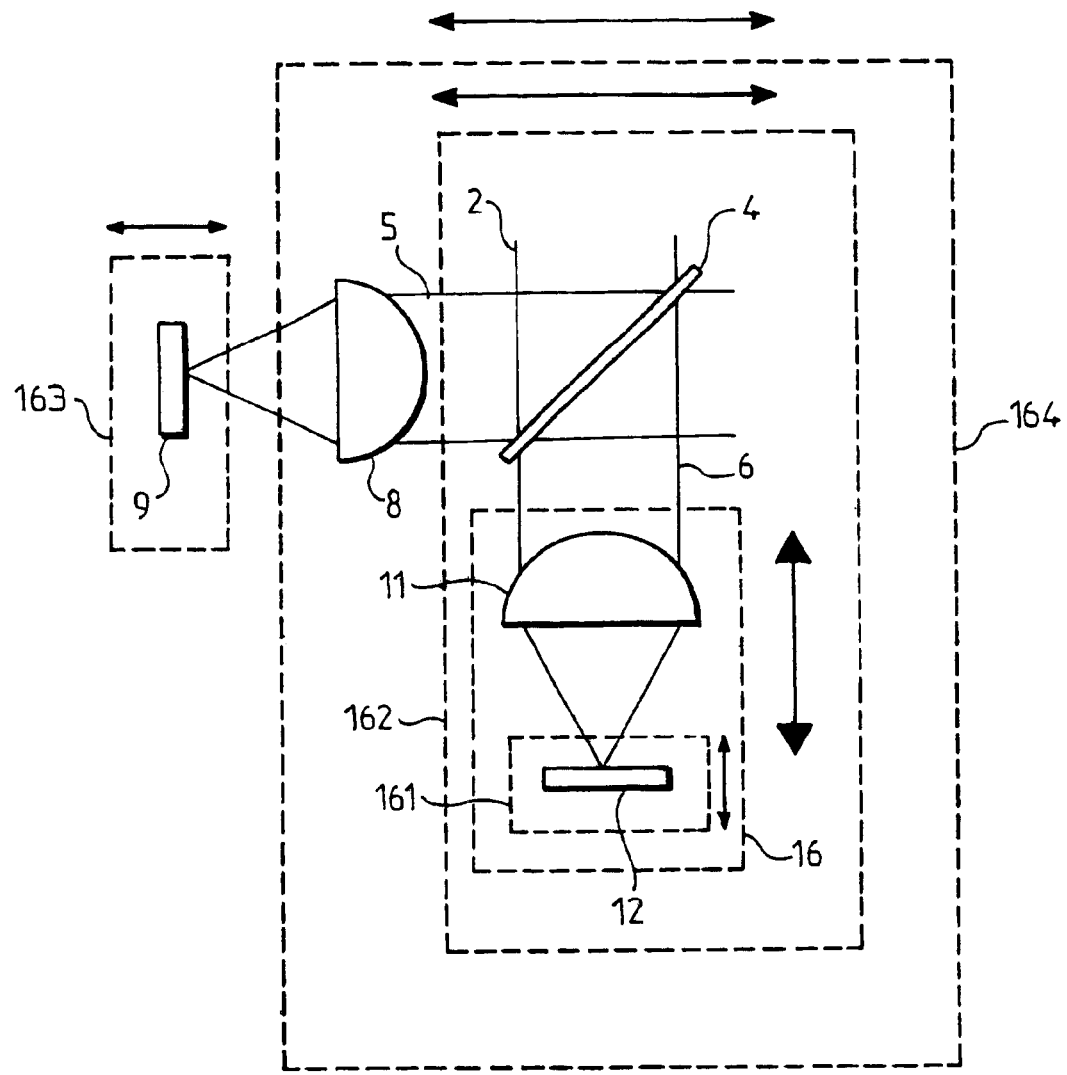
FIG. 2 is a schematic representation of the set of oscillating elements, within the framework of an interferometer of Linnik type, according to the invention.

The method and device for interferential microscopic imaging of an object, according to the invention, may be applied quite generally to any two wave interferential microscope. FIGS. 1 and 2 are, for instance, a schematic representation of the interferential imaging device, according to the invention, within the framework of an interferometer of Linnik type. A source 1 generates a luminous signal carried by a beam 2. Unlike the devices of the prior art, the use of a stroboscopic lighting source is not necessary. The light does not need to be polarised either. The luminous beam 2 is sent to one beamsplitter 3 comprising a cube separator 4 or a semi-transparent separating plate connected to a compensating plate placed at 45° of the incidence plane of the beam 2. It divides said beam 2 into two parts 5 and 6 of the same amplitude. These beams 5 and 6 are sent each to one of the arms of the interferometer. On a first arm 7 of the interferometer are positioned a lens 8 and an object 9 to be analysed. The lens 8 focuses the beam 5 onto the object 9. On a second arm 10 of the interferometer are positioned a lens 11 and a reference mirror 12 whereon the lens 11 is focussed. The lens 11 and the mirror 12 are mounted on a piezoelectric ceramic 13 whereof the electric excitation source 14 is synchronised on a multichannel detection system 15. The piezoelectric ceramic 13 represents a mechanical oscillator. It moves a set of elements 16 of the interferometer comprising, on FIG. 1, the lens 11 and the reference mirror 12. But this set of oscillating elements 16 (FIG. 2) may also be limited to the single reference mirror 12 (assembly 161), or comprise the lens 11, the reference mirror 12 and the separating cube 3 (assembly 162). It may also be the object to be analysed 9 alone (assembly 163) or the set of elements 164 comprising the reference lens 11, the mirror 12, the cube separator 4 and the lens 8.

Figure 3:
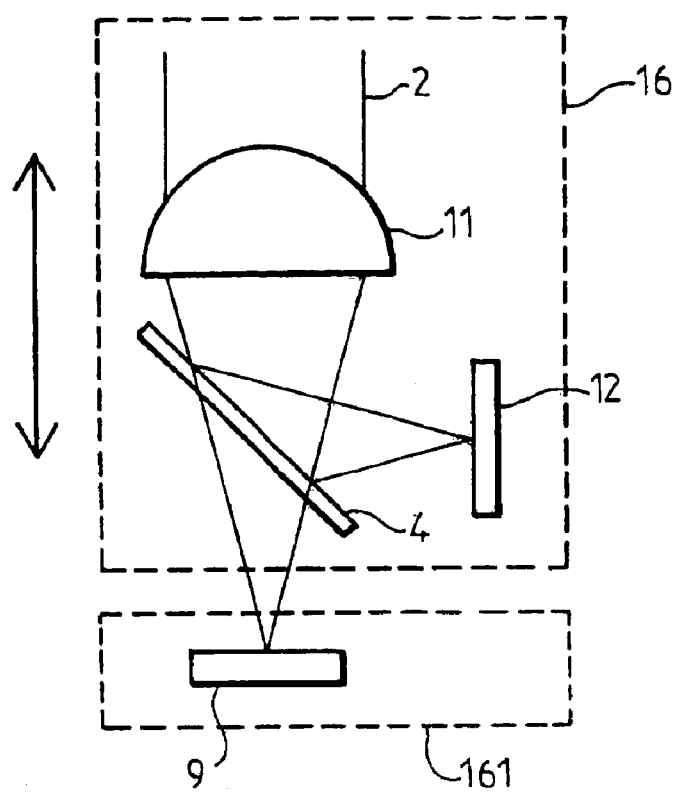
FIG. 3 is a schematic representation of the set of oscillating elements, within the framework of an interferometer of Michelson type, according to the invention.

In the case of a Michelson interferometer (FIG. 3), this set of oscillating elements 16 comprises the lens 11, the reference mirror 12 and the beamsplitter 3. This assembly is called a Michelson lens. The set of oscillating elements may also be limited to the object to be analysed 9 (assembly 161).

Figure 4:
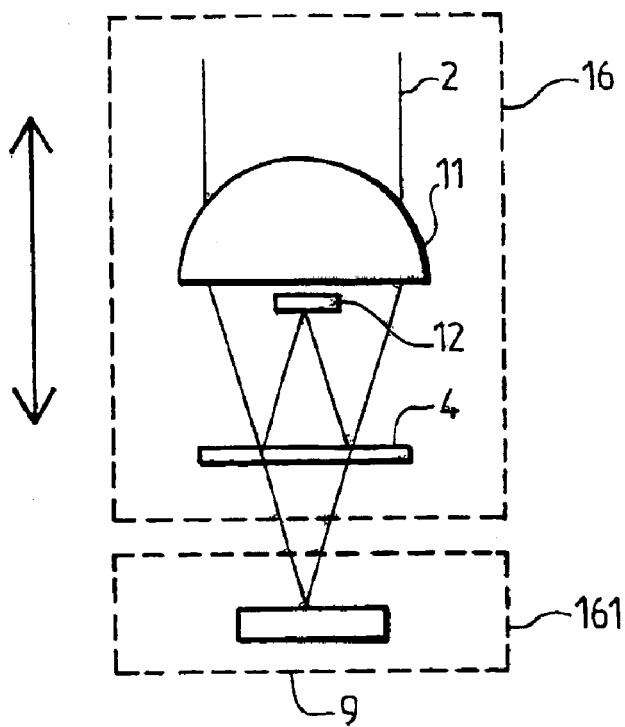
FIG. 4 is a schematic representation of the set of oscillating elements, within the framework of an interferometer of type Mirau, according to the invention.
Figure 5:
FIG. 5 is an example of approach for the acquisition of a phase image, representing the three successive steps 5a), 5b) and 5c).
Figure 5:
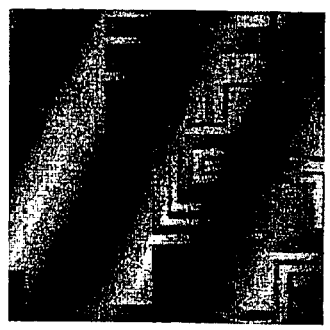
Figure 5:
Figure 5:
Figure 5:
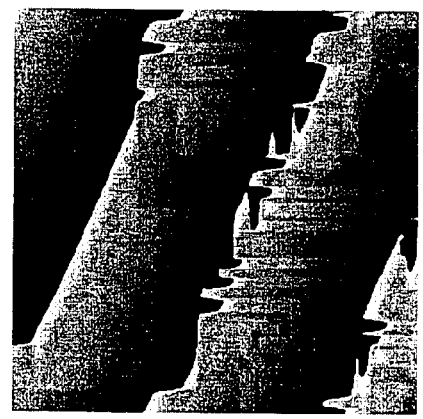

In the case of a Mirau interferometer (FIG. 4), this set of oscillating elements 16 is composed of the Mirau lens. It is called a Mirau lens, the set of elements composed of the lens 11, of the reference mirror 12 and of the beamsplitter 3. The set of oscillating elements may also be limited to the object to be analysed 9 (assembly 161).

A phase modulation is therefore obtained by causing the set of elements 16 to oscillate in a sine wave fashion. The amplitude of this oscillation is adjustable. The interference signal thus modulated (periodically but not as a sine wave) is integrated continuously during fractions 1/n, n being an integer and greater than or equal to 2, of the period of modulation T by the multichannel detection system 15. The multichannel detector 15 operates at a frequency f' so that f'=n f. The multichannel detection system 15 comprises an optical system 17 which focuses the beams on a camera CCD 18. The pixels of the camera CCD 18 detect thus, for a large number of points of the fields, the signal after interference. The camera CCD 18 is synchronized with the sine wave signal controlling the mechanical oscillation. The phase of this synchronisation may be adjusted in order to reduce the noise in the images of the object. Its value may be in the order of 1 rad. A computer 19 enables to record for instance, in a buffer memory, the data obtained during each fraction of period 1/n and to calculate, then, the image of the object. The production frequency of images depends on the operating speed of the camera 18. Nevertheless, the computer 19 must have the time to calculate the image out of a series of images stored in memory during the acquisition time of the next series.

One resorts to a light source exhibiting short coherence length to obtain tomographic images or to avoid the presence of spurious interferences. Such a source enables to localise fringes in a space window. The width of this window is in the order of a semi coherence length.

A quasi monochromatic source enables to visualize high three-dimensional heights, in the order of one coherence length. Such a quasi monochromatic source may be a white (halogen) source in front of which is placed an interferential filter.

The interference signal delivered by two-wave interferometers, at each point of the field, can be written as:

$$I = \bar{I} + A \cos\phi$$

where $\bar{I}$ is the mean intensity, $\phi$ is the optical phase and A is the amplitude of the interference fringes. By causing a lens 11 and the reference mirror 12 (and the beamsplitter 3 for the Michelson and the Mirau microscopes) to oscillate as described previously, a sine wave phase modulation is introduced whereof the amplitude is $\psi$, the synchronisation phase is $\theta$ and the period is $T=2\pi/\omega$. The intensity of the signal is then also time-modulated, periodically but not in a sine wave fashion:

$$I(t) = \bar{I} + A \cos[\phi + \psi \sin(\omega t + \theta)].$$

In the device of FIG. 1, the camera 18 operates at 200 Hz and the mechanical oscillation 16 at a frequency of 50 Hz. It is thus possible to obtain series of four images continuously.

The signal l(t) is therefore integrated successively during quarters of the modulation period T. These four images are written mathematically:

$$E_p = \int_{(p-1)T/4}^{pT/4} I(t)dt, \quad p = 1, 2, 3, 4$$

There follows a serial development l(t) of first kind Bessel functions $J_n$ and the images are then combined as follows:

$$\Sigma_s = -E1 + E2 + E3 - E4 = (4T/\pi)\Gamma_s A \sin\phi$$

$$\Sigma_c = -E1 + E2 - E3 + E4 = (4T/\pi)\Gamma_c A \cos\phi$$

where $$\Gamma_s = \Sigma(-1)^n [J_{2n+1}(\psi)/(2n+1)]\sin[(2n+1)\theta]$$

$$\Gamma_c = \Sigma[J_{4n+2}(\psi)/(2n+1)]\sin[2(2n+1)\theta]$$

This enables to access the phase $\phi$ which may be obtained according to the equation:

$$\tan\phi = (\Gamma_c/\Gamma_s)(\Sigma_s/\Sigma_c)$$

and the amplitude A given by:

$$A^2 = (\Gamma_c \Sigma_s)^2 + (\Gamma_s \Sigma_c)^2$$

It can be seen therefore that the acquisition of four images thus enables to determine completely the amplitude and the phase of the luminous wave coming from the object. However, these relations depend further on the amplitude $\psi$ and on the synchronisation phase $\theta$ of the sine wave phase modulation, by means of the parameters $\Gamma_c$ and $\Gamma_s$. These parameters may be adjusted advantageously, so that the formulas, mentioned above, are simplified. For instance, the modulation amplitude ψ=2.45 rad and the synchronisation phase θ=0.98 rad enable such simplification, one obtains then:

$$\tan\phi = (\Sigma_s/\Sigma_c) = (E1-E2-E3+E4)/(E1-E2+E3-E4)$$

and $$A^2 = (E1-E2-E3+E4)^2 + (E1-E2+E3-E4)^2$$

FIG. 2 represents an acquisition example of a phase image. Each intermediate image $E_p$ (p=1 to 4) has been obtained successively during quarters of the modulation period T (5a). The calculation of the phase based on the formulas established above is performed in real time (5b). A phase image modulo 2π (or π) of the object (9) to be analysed is generated by the computer (19) (5c). The phase is then unwrapped to obtain a topographic image. Phase unwrapping consists in adding (or subtracting) a phase-shift of 2π (or π) at each discontinuity.

This method and this device for interferential microscopic imaging of an object may advantageously be applied to the characterisation of thin layers and of interfaces, for controlling microelectronic components. They may also be used within the framework of high rate controls and inspections; in biology; when studying time-unstable objects (for example, in vivo studies, oscillating phenomena) or objects in unstable environments (for example, in the presence of vibrations or of drifts).

What is claimed is:

1. An interferential microscopic imaging method of an object (9) wherein:
    a beam (2) coming out of a light source (1) is sent to each of the arms of a two-wave interferometer, one (7) of the arms comprising an object (9),
    continuous phase variation in the interference signal (S) is introduced, consisting of a sine wave modulation of frequency f,
    the interference signal (S) is integrated during this phase variation by means of a multichannel detector (15),
    characterised in that:
    the modulation of the interference signal (S) results from the mechanical oscillation of a set of elements (16) of the interferometer and has an amplitude ψ and a synchronisation phase θ,
    the multichannel detector (15) operates at a frequency f' so that f'=n f, n being an integer and greater than or equal to 2,
    the integration of the interference signal (S) takes place during fractions 1/n of a modulation period,
    the integrated interference signal is processed digitally in order to calculate an image.

2. A method according to claim 1, characterised in that the modulation amplitude ψ and the synchronisation phase of the mechanical oscillation are adjustable.

3. A device for interferential microscopic imaging of an object (9) comprising:
    a light source (1) which generates a luminous beam (2),
    a two-wave interferometer wherein a sine wave phase modulation of frequency f is introduced,
    an object (9) to be analysed, placed on one (7) of the arms of the two-wave interferometer,
    an optical system (8) focussing the beam (5), coming out of the beamspliter (3) on the object (9) to be analysed,
    a multichannel detector (15) which integrates the interference signal (S),
    characterised in that:
    a mechanical oscillator moves a set of elements of the interferometer thereby modulating the interference signal (S),
    the multichannel detector (8) operating at a frequency f' so that f'=n f, n being an integer and greater than or equal to 2, and generating the integration of the interference signal (S) during fractions 1/n of a modulation period,
    a computer (19) enables to record the integrated interference signal obtained during each fraction of period 1/n and to calculate, then, the image of the object.

4. A device according to claim 3, characterised in that the mechanical oscillator (13) is a piezoelectric system.

5. A device according to claim 3, characterised in that the source (1) is a quasi monochromatic light source.

6. A device according to claim 3, characterised in that the source (1) is a light source exhibiting short coherence length.

7. A device according to claim 3, characterised in that the interferometer is of Linnik type and the set of oscillating elements (16) is the Linnik interferometer, itself, composed of the reference lens, of the reference mirror whereon the lens is focussed, of the beamsplitter, of the lens object and any dephasing plates.

8. A device according to claim 3, characterised in that the interferometer is of Linnik type and the set of oscillating elements (16) is limited to the single reference mirror.

9. A device according to claim 3, characterised in that the interferometer is of Mirau type and the set of oscillating elements is (16) the Mirau lens itself.

10. A device according to claim 3, characterised in that the interferometer is of Michelson type and the set of oscillating elements (16) is composed of the lens, of the reference mirror and of the beamsplitter, an assembly called a Michelson lens.

* * * * *

UNITED STATES PATENT AND TRADEMARK OFFICE
CERTIFICATE OF CORRECTION

PATENT NO. : 6,940,602 B2
DATED : September 6, 2005
INVENTOR(S) : Arnaud Dubois et al.

It is certified that error appears in the above-identified patent and that said Letters Patent is hereby corrected as shown below:

Title page,
Item [73], Assignee, change "Scientific" to -- Scientifique --.

Signed and Sealed this

Twenty-fourth Day of January, 2006

JON W. DUDAS
*Director of the United States Patent and Trademark Office*